(12) United States Patent
Strand et al.

(10) Patent No.: US 9,381,585 B2
(45) Date of Patent: Jul. 5, 2016

(54) METHOD OF MANUFACTURING A STAINLESS STEEL PRODUCT

(75) Inventors: Per-Olov Strand, Sandviken (SE); Anders Soderman, Bredangsgatan (SE)

(73) Assignee: Sandvik Intellectual Property AB, Sandviken (SE)

( * ) Notice: Subject to any disclaimer, the term of this patent is extended or adjusted under 35 U.S.C. 154(b) by 850 days.

(21) Appl. No.: 13/581,513

(22) PCT Filed: Feb. 25, 2011

(86) PCT No.: PCT/SE2011/050220
§ 371 (c)(1),
(2), (4) Date: Aug. 28, 2012

(87) PCT Pub. No.: WO2011/108977
PCT Pub. Date: Sep. 9, 2011

(65) Prior Publication Data
US 2012/0324972 A1    Dec. 27, 2012

(30) Foreign Application Priority Data
Mar. 3, 2010   (SE) .................................... 1050205-2

(51) Int. Cl.
*B23D 79/12*   (2006.01)
*B21C 37/04*   (2006.01)
*B21C 43/00*   (2006.01)

(52) U.S. Cl.
CPC .............. *B23D 79/12* (2013.01); *B21C 37/045* (2013.01); *B21C 43/00* (2013.01)

(58) Field of Classification Search
CPC ...................................................... B23D 79/12
See application file for complete search history.

(56) References Cited

U.S. PATENT DOCUMENTS

| 2,679,680 | A | * | 6/1954 | Hanks ....................... B21C 3/02 |
| | | | | 407/14 |
| 3,055,102 | A | * | 9/1962 | Shaw et al. ........................ 72/41 |
| 3,760,488 | A | | 9/1973 | Cucuz |
| 4,799,300 | A | | 1/1989 | Phillips |
| 4,867,026 | A | * | 9/1989 | Henning .............. B23D 61/021 |
| | | | | 83/835 |
| 5,277,048 | A | * | 1/1994 | Lubas ....................... B21C 9/00 |
| | | | | 72/319 |
| 2009/0217795 | A1 | * | 9/2009 | Vosough et al. ............. 84/297 S |
| 2010/0000636 | A1 | * | 1/2010 | Bonnefois ............. C22C 38/005 |
| | | | | 148/541 |

(Continued)

FOREIGN PATENT DOCUMENTS

| CN | 101403077 A | 4/2009 |
| DE | 3741138 C1 | 7/1988 |
| EP | 0608466 A1 | 8/1994 |

(Continued)

*Primary Examiner* — Shelley Self
*Assistant Examiner* — Gregory Swiatocha
(74) *Attorney, Agent, or Firm* — Morgan, Lewis & Bockius LLP

(57) ABSTRACT

A method of manufacturing a duplex stainless steel wire product starting from wire rod, includes the steps of: roughening the wire rod surface; applying a carrier coating on the wire rod surface; peeling the wire rod using a shaving die comprising cemented carbide; roughening the wire rod surface; applying a carrier coating on the wire rod surface; and drawing to final wire dimension. In the peeling step, the shaving die used has a rake face land angle η which is 10-30°, a rake angle γ which is 10-25°, a clearance angle α which is 3-10°, a rake face land width w which is 0.1-0.5 mm, and an edge radius which is 0.02-0.08 mm. The duplex stainless steel wire product manufactured according to the method exhibits excellent fatigue resistance.

5 Claims, 2 Drawing Sheets

(56) References Cited

U.S. PATENT DOCUMENTS

| | | | |
|---|---|---|---|
| 2012/0051854 A1* | 3/2012 | Pretorius | B23B 27/04 407/100 |
| 2012/0202088 A1* | 8/2012 | Cacace | 428/576 |

FOREIGN PATENT DOCUMENTS

| | | | | |
|---|---|---|---|---|
| GB | 844178 | A | 8/1960 | |
| GB | 908063 | A | 10/1962 | |
| GB | 1196316 | A | 6/1970 | |
| GB | 1253410 | A | 11/1971 | |
| GB | 0907737 | D0 * | 6/2009 | ........ B23B 27/04 |
| JP | 63281762 | A | 11/1988 | |
| JP | 3060917 | A | 3/1991 | |
| JP | H05228729 | A | 9/1993 | |
| JP | H06339810 | A | 12/1994 | |
| JP | 9141325 | A | 6/1997 | |
| WO | 2004079027 | A1 | 9/2004 | |
| WO | 2006049572 | A1 | 5/2006 | |
| WO | 2008054300 | A1 | 5/2008 | |

* cited by examiner

METHOD OF MANUFACTURING A STAINLESS STEEL PRODUCT

RELATED APPLICATION DATA

This application is a §371 National Stage Application of PCT International Application No. PCT/SE2011/050220 filed Feb. 25, 2011 claiming priority of Swedish Application No. 1050205-2, filed Mar. 3, 2010.

The present invention relates to a method of manufacturing a duplex stainless steel wire product.

BACKGROUND

Duplex stainless steel alloys have a microstructure consisting of about 45 to 65% austenite and 35 to 55% ferrite. The two-phase structure prevents grain growth and the fine grain size thus contributes to the very high strength of duplex stainless steel alloys. Compared to austenitic stainless steel wire products, duplex stainless steel wire products are known to have excellent corrosion resistance and high mechanical strength in combination with good fatigue properties, and are therefore suitable for spring applications in for example seawater applications.

The production route for duplex stainless steel wire products starts with wire rod, annealed or non-annealed, with a diameter of 5.5-12 mm. The wire rod is pickled in hydrochloric acid to remove the oxide scale and a carrier, normally hydrated sodium, is coated onto the surface of the wire rod to facilitate drawing. The wire rod is then cold drawn in several reduction steps to the final wire dimension. An intermediate annealing step is usually necessary to reach final dimensions below 2.5 mm. The final wire product obtained can be used in for example spring applications where excellent corrosion resistance is necessary.

However, for certain applications, where the end product is subjected to severe high cycle fatigue and high dynamic stresses, such as springs for injection pumps, it is desirable to improve the fatigue properties of duplex stainless steel wire products. A well-known production route for conventional austenitic stainless steel and precipitation hardenable stainless steel wire products with improved fatigue properties includes a peeling step, which gives an end product with better surface quality and therefore less initiation points for cracks and consequently improved fatigue resistance. The production route for peeled austenitic stainless steel wire products includes, apart from the above mentioned steps used to produce duplex stainless steel wire products, a peeling step using a shaving die before drawing to final dimension, and an extra pickling step after peeling, including salt bath furnace, white pickling, hydrochloric acid and application of carrier coating. Because of the special properties of duplex stainless steel wire, such as its high mechanical strength and its combination of austenite and ferrite, it has however turned out difficult to adjust the peeling process such that it is possible to include in the production route for duplex stainless steel wire. The ferrite phase tends to stick on the shaving die while the austenite phase is tough and hard, which result in a high tool wear and poor chip breakage. Even in annealed condition, when the grain size of stainless steel alloys is usually larger, the grain size of duplex stainless steel alloys is small, which in combination with the chemical composition creates a very hard material. Thus, the properties of duplex stainless steel alloys make it difficult to peel duplex stainless steel wire rod.

SUMMARY OF THE INVENTION

The objective problem is therefore to provide a method for manufacturing a duplex stainless steel wire product exhibiting improved fatigue resistance compared to conventionally manufactured duplex stainless steel wire products. The objective problem is solved by a method of manufacturing a duplex stainless steel wire product starting from wire rod, the method comprising the following steps: roughening the wire rod surface; applying a carrier coating on the wire rod surface; peeling the wire rod using a shaving die comprising cemented carbide; roughening the wire rod surface; applying a carrier coating on the wire rod surface; and drawing to final wire dimension. In the peeling step, the shaving die used has a rake face land angle η which is 10-30°, a rake angle γ which is 10-25°, a clearance angle α which is 3-10°, a rake face land width w which is 0.1-0.5 mm, and an edge radius which is 0.02-0.08 mm. The method of manufacturing according to the invention results in a peeled duplex stainless steel wire product. By using the method according to the invention, the amount of surface defects in the finished duplex stainless steel wire product can be significantly decreased compared to conventionally manufactured duplex stainless steel wire products, resulting in improved fatigue resistance.

DETAILED DESCRIPTION

The starting product for the method of manufacturing a peeled duplex stainless steel wire product according to the present invention, hereinafter referred to as a peeled duplex wire product, is duplex stainless steel wire rod with a diameter of 5.5-12 mm, which can be annealed or non-annealed. Annealing normally gives a larger grain size and a softer material. However, the effect is negligible for duplex stainless steel wire rod and both kinds may therefore be used.

The method of manufacturing according to the invention comprises the following steps:

Roughening of the wire rod surface, preferably by pickling in hydrochloric acid, especially if there is oxide scale resulting from annealing on the wire rod surface. This can be combined with a tougher pickling using salt bath furnace and white pickling. However, also mechanical roughening is possible as an alternative to pickling.

Applying a carrier coating, preferably hydrated sodium borate, on the wire rod surface.

Figure 1:
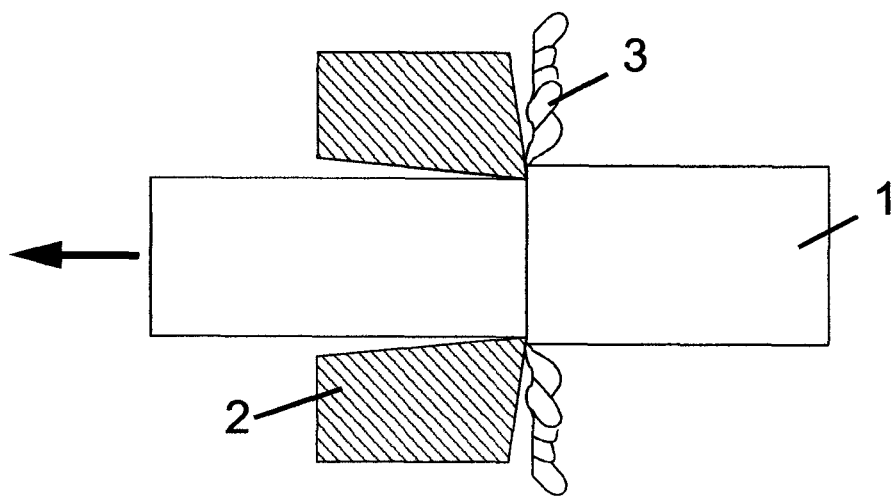
FIG. 1 is a schematic drawing of the peeling process.
Figure 2A:
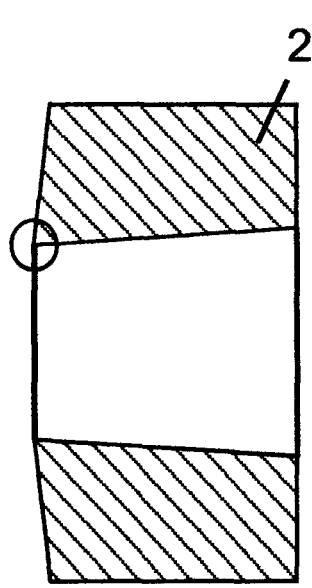
FIGS. 2a-2b are schematic drawings of a shaving die.
Figure 2B:
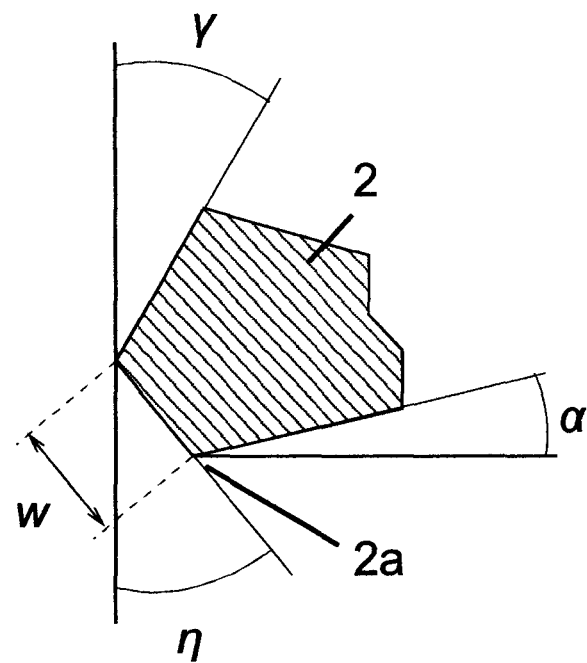

Peeling off the surface layer using a shaving die. The peeling process is schematically shown in FIG. 1 (not drawn to scale). Previous to the shaving die, a drawing die is preferably situated to straighten and guide the wire rod (1) into the shaving die (2). The wire rod diameter is slightly reduced during the drawing operation. Approximately 0.2 to 0.5 mm of the wire rod diameter is peeled off during the peeling operation. A lubricant, preferably calcium stearate lubricant, is used to reduce the friction during drawing and emulsion is sprayed on the drawn wire and on the shaving die to lower friction and cool the die during peeling. A hard cemented carbide composition must be used in the shaving die, preferably a material belonging to the ISO grade P10. The shaving die has a rake face land angle η, a clearance angle α, a rake angle γ, a rake face land width w, and an edge radius. FIG. 2a is a schematic cross-sectional view of the shaving die. FIG. 2b shows a magnification of the encircled area in FIG. 2a, showing the different die angles and the rake face land width. The drawings are not drawn to scale.

The rake face land angle η influences the cutting forces of the chip (3). A larger angle makes the tool more stable and less sensitive to wear, but at the same time makes the chip cutting process heavier, causing higher shear stresses and cutting forces and thus elevated temperatures. High temperatures at the rake face deteriorate tool life. The rake face land angle mainly influences the part of the tool that is close to the edge. In order to make the cutting edge as strong as possible and at the same time minimise the heat generated during the peeling process, the rake face land angle should be at least 10° and maximum 30°. According to the present invention, the rake face land angle η is 10-30°, preferably 15-20°.

The clearance angle α influences the surface of the peeled wire. The larger this angle is, the less the surface is influenced by the pressure of the cutting forces. In order to minimise the contact pressure and thereby the heat generated, the clearance angle should be at least 3° or larger. However, making this angle larger also makes the edge wear faster and thereby the peeled surface is more influenced by the cutting forces. A large clearance angle also gives an edge which is more sensitive to edge fracture and breakage of the tool. In order to make the cutting edge as strong as possible, the clearance angle should not exceed 10°. According to the present invention, the clearance angle α is 3-10°, preferably 5-7°, or even more preferably approximately 6°.

The rake face land width w, similarly to the rake face land angle, influences the cutting forces of the chip. In order to make the cutting edge as strong as possible and at the same time minimise the heat generated during the peeling process, the rake face land width should be at least 0.1 mm to increase the strength of the cutting edge, and maximum 0.5 mm so that the rake face temperature is kept at an acceptable level. According to the present invention, the rake face land width w is 0.1-0.5 mm, preferably approximately 0.3 mm.

Also the rake angle γ influences the cutting forces of the chip. A larger rake angle makes the tool less stable and more sensitive to wear but at the same time makes the chip cutting process smoother, causing lower shear stresses and cutting forces. The chip flow and the knurling of the chip are controlled by the rake angle. A larger positive rake angle gives a more knurled chip. In order to optimise the chip flow while minimising the heat generated during cutting, the rake angle should be at least 10°. However, the rake angle should not exceed 25° for the shaving die to be stable and not too sensitive to wear. According to the present invention, the rake angle γ is 10-25°, preferably 10-20°, or even more preferably approximately 15°.

The combination of the rake face land angle the rake face land width w and the rake angle γ gives the total energy consumption of the chip formation process, thereby controlling the total energy of the chip formation process.

The shaving die also has an edge radius determining the sharpness of the cutting edge (2a). The edge radius should be at least 0.02 mm to make the cutting edge as strong as possible and maximum 0.08 mm to minimise the heat generated during the cutting process. According to the present invention, the edge radius is 0.02-0.08 mm, preferably 0.03-0.06 mm, or even more preferably 0.03-0.05 mm.

The combined set of shaving die parameters makes the shaving die according to the invention suitable for peeling duplex stainless steel wire rod, with its combination of sticky ferrite phase and tough and hard austenite phase.

Table 1 shows a summary of the angles used in a standard shaving die for peeling of austenitic stainless steel wire rod together with the angle intervals used in the manufacturing method according to the invention.

TABLE 1

Typical values of standard shaving die and duplex shaving die intervals.

| | Standard shaving die | Duplex shaving die |
| --- | --- | --- |
| Rake face land angle η | 10° | 10°-30° |
| Rake angle γ | 0° | 10-25° |
| Clearance angle α | 6° | 3-10° |

Roughening of the wire rod surface, preferably by pickling in salt bath furnace, followed by white pickling and pickling in hydrochloric acid in order to roughen the surface and etch the grain boundaries. Alternatively, the surface may be mechanically roughened. The roughening step is needed since the surface after peeling is very smooth and impossible to dry draw. It is also impossible to get a good carrier and drawing lubricant pick up on the smooth surface.

Applying a carrier coating on the wire surface. Preferably, the carrier coating consists of hydrated sodium borate.

Drawing continuously from roll to roll to final dimension, preferably in several steps using a number of successively more narrow drawing dies. Typically 4-10 drawing dies are needed. For example, to reduce the wire diameter from 8.2 mm to 3.6 mm, seven drawing dies are needed.

The resulting peeled duplex wire product manufactured according to the inventive method should preferably be free from surface defects deeper than 6% of the finished wire diameter or protruding more than 6% of the finished wire diameter.

The wire rod according to the invention preferably has the following composition, in percent by weight, $0 \leq C \leq 0.5$
$0.1 \leq Si < 2.0$
$0.1 \leq Mn \leq 7.0$
$0.1 \leq Ni \leq 8.0$
$18 \leq Cr \leq 35$
$0 \leq Cu \leq 3.0$
$0.10 \leq N \leq 0.6$
$0 \leq Mo \leq 6.0$
$0 \leq W \leq 1.0$
$0 \leq V \leq 1.0$
$0 \leq Ti \leq 1.0$
$0 \leq Al \leq 1.0$
$0 \leq Nb \leq 1.0$
$0 \leq Co \leq 1.5$ balance Fe and normally occurring impurities. The austenite content is preferably 45-65% and the ferrite content is preferably 35-55%.

More preferably, the wire rod has a composition according to standard UNS S31803, or even more preferably the wire rod has a composition according to standard UNS S32205.

In a preferred embodiment of the invention, duplex stainless steel wire rod according to standard UNS S32205, delivered in non-annealed condition, was pickled and coated prior to the peeling. Several different types of shaving dies were tested and the die angles were evaluated. Results from the test are shown in table 2. Sample 1 and 2 were shaving dies according to the present invention and samples 3-5 were reference samples. Sample 5 was a standard shaving die used for peeling austenitic stainless steel wire rod. The carbide grade used in the shaving dies was the commercially available grade MP10 (Sandvik). The clearance angle α was 6°, the rake face land width w was 0.3 mm, and the edge radius was 0.05 mm for all dies tested.

TABLE 2

Results from peeling of duplex stainless steel wire rod.

| Sample | η | γ | Result wire surface | Result shaving die |
|---|---|---|---|---|
| 1 | 15° | 15° | Good | The die is in good condition |
| 2 | 20° | 15° | Good | The die is in good condition |
| 3 | 15° | 0° | Failure | Cracked die |
| 4 | 20° | 0° | Failure | Crack in the shaving die entrance |
| 5 | 10° | 0° | Failure | Cracked die |

Samples 1 and 2, showing good results after peeling, were then pickled and coated with carrier coating and drawn to final dimension using seven drawing dies. The wires were drawn in a multi block machine, directly from peeled wire rod of 8.2 mm to final dimension of 3.6 mm. Calcium stearate was used as a lubricant in the first three die boxes and sodium stearate in the rest. The material temperature does not increase much during the first drawing steps due to low speed and relatively soft material. Calcium which has a low melting temperature is therefore the best choice. When the material deformation hardens and the drawing speed increases, a lubricant with higher melting point must be used. Sodium soap is therefore always used in the last reduction steps.

The temperature of the cooling water on the dies and capstans was kept at 30±5° C. to obtain a good lubrication film on the wire. The drawing speed at final dimension did not exceed 5 m/s.

Figures 3A, 3B, 3C:
FIGS. 3a-3c show eddy current test results.

Surface quality measurements on the final peeled stainless steel duplex wire were done continuously after the last reduction step using Eddy Current (EC) testing. EC testing is a non-destructive testing method to detect surface irregularities and cracks. A reference standard was used to calibrate the instrument; the longitudinal notches of the reference standard had a U-shaped profile with a depth of 6% of the wire diameter (0.2 mm), a length of 10 mm and a width of 0.10 mm. In FIG. 3, the EC test results of 3.6 mm peeled duplex stainless steel wire (FIG. 3a) is shown together with standard 3.6 mm duplex stainless steel wire drawn from non-annealed (FIG. 3b) wire rod. The horizontal scale represents time t and the vertical scale represents detected signal amplitude A. Each test was run for approximately 8 min, which corresponds to around 1000 m finished wire for a wire speed of 2 m/s. FIG. 3c shows the EC test of the reference standard drawn manually at a much lower speed. As can be seen from the test results, the peeled duplex stainless steel wire has much less indication, or less surface defects, compared to the standard 3.6 mm duplex stainless steel wire drawn from non-annealed wire rod.

It can therefore be concluded that the method of manufacturing according to the invention results in significantly improved fatigue resistance, since cracks starting from surface defects are the most common cause for fatigue fractures, especially in the cycle range up to 100,000,000 cycles which is the main focus for peeled duplex wire products according to the invention.

The corrosion resistance may be determined theoretically by calculating the PRE value or experimentally by corrosion testing. Critical Pitting Temperature (CPT) is a common and well known corrosion testing method. CPT is determined electrochemically by applying a constant potential (potentiostatic method) and measuring the temperature at which the current increases drastically.

The CPT values of a duplex stainless steel wire sample according to the invention and a comparative sample of the stainless steel alloy 17-7 PH were determined. The samples were immersed in a 0.1% NaCl solution at a constant potential of 300 mV. The temperature of the solution was increased by 5° C. each 5 min until corrosion on the samples could be registered.

The PRE value is defined as:

PRE, Pitting Resistance Equivalent=% Cr+3.3×% Mo+16×% N.

A higher PRE value corresponds to a better corrosion resistance.

The PRE and CPT values of the duplex stainless steel alloy according to standard UNS S32205 are compared to the corresponding values of the precipitation hardenable stainless steel alloy 17-7 PH, often used in high-fatigue spring applications, in table 3.

TABLE 3

Corrosion properties of steel alloys.

|  | PRE | CPT (+300 mV, 1% Cl⁻) |
|---|---|---|
| UNS S32205 | 35 | 78° C. |
| 17-7 PH | 18 | 25° C. |

For several high fatigue spring applications, such as pump springs in corrosive media and springs for aerospace applications, 17-7 PH is insufficient due to poor corrosion properties. In many applications, a passivation is needed on 17-7 PH to get a sufficient corrosion resistance. With the manufacturing method according to the invention, this extra production step is not necessary, thus resulting in a more cost-efficient product. Also when compared to non-peeled duplex stainless steel wire products, peeled duplex wire products exhibit better corrosion properties thanks to their smooth surfaces with less initiation points for corrosion. Peeled duplex wire products thus have superior corrosion properties compared to both peeled precipitation hardenable stainless steel wire products such as 17-7 PH and non-peeled duplex stainless steel wire products, while at the same time exhibiting excellent fatigue properties. It can be concluded that peeled duplex wire products according to the present invention are very suitable for use in high fatigue spring applications in corrosive media.

The invention claimed is:

1. A method of manufacturing a duplex stainless steel wire product comprising the steps of:
   providing a wire rod;
   roughening a surface of the wire rod;
   applying a carrier coating on the wire rod surface;
   peeling the wire rod using a shaving die, wherein the shaving die is a cemented carbide;
   roughening the wire rod surface a second time;
   applying another carrier coating on the wire rod surface; and
   drawing the wire rod to a final wire dimension,
   wherein in the peeling step, the shaving die has a rake face land angle η which is 10-30°, a rake angle γ which is 10-25°, a clearance angle α which is 3-10°, a rake face land width w which is 0.1-0.5 mm, and an edge radius which is 0.02-0.08 mm.

2. A method of manufacturing a duplex stainless steel wire product according to claim 1, wherein the rake face land angle η is 15-20°.

3. A method of manufacturing a duplex stainless steel wire product according to claim 1, wherein the rake angle γ is 10-20°.

4. A method of manufacturing a duplex stainless steel wire product according to claim 1, wherein the clearance angle α is 5-7°.

5. A method according to claim 1, wherein the wire rod has a composition, in percent by weight of, $0 \leq C \leq 0.5$
$0.1 \leq Si \leq 2.0$
$0.1 \leq Mn \leq 7.0$
$0.1 \leq Ni \leq 8.0$
$18 \leq Cr \leq 35$
$0 \leq Cu \leq 3.0$
$0.10 \leq N \leq 0.6$
$0 \leq Mo \leq 6.0$
$0 \leq W \leq 1.0$
$0 \leq V \leq 1.0$
$0 \leq Ti \leq 1.0$
$0 \leq Al \leq 1.0$
$0 \leq Nb \leq 1.0$
$0 \leq Co \leq 1.5$ the balance being Fe and normally occurring impurities, wherein the ferrite content is 35-55% and the austenite content is 45-65%.

\* \* \* \* \*